US008721876B2

(12) United States Patent
Briscoe (10) Patent No.: US 8,721,876 B2
(45) Date of Patent: May 13, 2014

(54) WATER TREATMENT SYSTEM (75) Inventor: Nicholas James Briscoe, Mudgeeraba (AU)

(73) Assignee: Waterco Limited, Rydalmere (AU)

( * ) Notice: Subject to any disclaimer, the term of this patent is extended or adjusted under 35 U.S.C. 154(b) by 0 days.

(21) Appl. No.: 13/997,858

(22) PCT Filed: Feb. 3, 2012

(86) PCT No.: PCT/AU2012/000102
§ 371 (c)(1),
(2), (4) Date: Jun. 25, 2013

(87) PCT Pub. No.: WO2012/103597
PCT Pub. Date: Aug. 9, 2012

(65) Prior Publication Data
US 2013/0284647 A1    Oct. 31, 2013

(30) Foreign Application Priority Data

Feb. 4, 2011  (AU) ............................... 2011900353

(51) Int. Cl.
C02F 1/78 (2006.01)
C02F 1/72 (2006.01)
C02F 1/00 (2006.01)

(52) U.S. Cl.
CPC .  *C02F 1/722* (2013.01); *C02F 1/78* (2013.01); *C02F 1/008* (2013.01); C02F 2209/38 (2013.01); C02F 2209/40 (2013.01); C02F 2209/04 (2013.01)
USPC .......... 210/96.1; 210/134; 210/138; 210/205; 210/192

(58) Field of Classification Search
None
See application file for complete search history.

(56) References Cited

U.S. PATENT DOCUMENTS

| 5,364,537 | A  | * | 11/1994 | Paillard | 210/743 |
| 6,274,052 | B1 | * | 8/2001  | Hartwig  | 210/760 |
| 6,517,713 | B2 | * | 2/2003  | Gargas   | 210/192 |
| 7,744,765 | B2 | * | 6/2010  | Bjerkan et al. | 210/741 |

(Continued)

FOREIGN PATENT DOCUMENTS

| JP | 2001225088 A  | 8/2001 |
| JP | 2002355684 A  | 12/2002 |
| WO | 2006042373 A1 | 4/2006 |
| WO | 2009036512 A1 | 3/2009 |

OTHER PUBLICATIONS

International Preliminary Report on Patentability issued in corresponding application No. PCT/AU2012/000102 completed Dec. 20, 2012.

*Primary Examiner* — Terry Cecil
(74) *Attorney, Agent, or Firm* — Carter DeLuca Farrell & Schmidt LLP (57) ABSTRACT An apparatus for treating water stored in a reservoir to remove contaminants has a feed line for receiving water and a by-pass valve that controls the flow of water through the feed line. A venturi valve responds to the rate of flow of water through a flow line by creating a vacuum in a supply line from an ozone generator, the extent of the vacuum created being dependent on the rate of flow, to add ozone at a controlled rate to the water to be treated. A sensor probe measures the oxidation reduction potential of the water, to supply hydrogen peroxide to the water at a controlled rate dependent on the oxidation reduction potential level. The ozone and the hydrogen peroxide are mixed with the water in a multicyclone unit to allow a peroxone reaction to occur that treats the water, and the treated water is returned to the reservoir.

19 Claims, 6 Drawing Sheets

(56) References Cited

U.S. PATENT DOCUMENTS

| | | | |
|---|---|---|---|
| 7,875,173 B1 * | 1/2011 | Barnes | 210/167.1 |
| 7,883,622 B1 * | 2/2011 | Barnes | 210/143 |
| 2006/0081541 A1 | 4/2006 | Kozyuk | |
| 2008/0302735 A1 * | 12/2008 | Denkewicz et al. | 210/748 |
| 2009/0255874 A1 * | 10/2009 | Tenne | 210/638 |
| 2011/0049024 A1 * | 3/2011 | Pank | 210/104 |

* cited by examiner

WATER TREATMENT SYSTEM

FIELD OF THE INVENTION

The present invention relates to water treatment systems and, in particular, to a water contaminant disinfection and sanitization system for use with swimming pools, spas, domestic water tanks and any body of water requiring disinfection and sanitization for the purpose of creating potable water. More particularly, the present invention relates to apparatus and methods for preventing biological growth (of such organisms as bacteria and algae) and for inactivating contaminating organic matter (such as viruses and high molecular weight organic compounds) in a reservoir of water by a process of ozonating the water and then supplying hydrogen peroxide thereto.

Although the background, objects and preferred embodiments of the invention will be hereinafter described with reference to apparatus and methods for treatment of water in a swimming pool, it is to be understood that the invention is not limited thereto but has wider application. For example, the water treatment apparatus and methods may be used with spas and domestic water tanks. It is to be understood that the terminology employed herein is for the purpose of description only and should not be regarded as limiting. For instance, the terms "comprising" or "comprises" are to be understood as meaning "including", unless otherwise stated. Also, the term "water" is to be understood as including any quantity of water that may contain contaminating biological and other organic material, the presence of which would be deleterious to a person's health.

BACKGROUND OF THE INVENTION

The need to disinfect and sanitize swimming pools is an ongoing responsibility of persons who wish to swim in clean pool water. Chlorine is an oxidizing agent that has been commonly used for such a purpose, and whilst it is generally effective, it has many drawbacks. The odour and taste of chlorinated water (even at the low concentrations used in pool water) are not appealing, and large quantities of chlorine pre-mix are required.

A little known approach to large scale drinking water treatment based on oxidizing agents is to supply hydrogen peroxide to ozonated water (in a process that produces an equilibrium state referred to as "peroxone").

Highly reactive hydroxyl free radicals are a product of the peroxone process, and it is these hydroxyl radicals that are the primary oxidizing agents involved in contaminant disinfection and sanitization of water. Although hydroxyl radicals are produced during the spontaneous decomposition of ozone (to cause "direct oxidation" of contaminants in water), an even greater concentration of hydroxyl radicals may be produced by accelerating the rate of ozone decomposition by the addition of hydrogen peroxide thereto (to cause "indirect oxidation" of contaminants in water). A higher hydroxyl radical concentration will increase the oxidation rate.

It has now been found by the present inventor that the peroxone process may be applied to the disinfection and sanitization of water stored in smaller reservoirs than those used in large scale drinking water storage, with the use of an apparatus and method that supplies hydrogen peroxide to ozonated water at a controllable rate.

SUMMARY OF THE INVENTION

It is, therefore, an object of the present invention to provide a water treatment system that does not require the use of chlorine as the oxidizing agent.

It is another object of the present invention to provide an apparatus and a method for preventing biological growth (of such organisms as bacteria and algae) and for inactivating contaminating organic matter (such as viruses and high molecular weight organic compounds) in a reservoir of water by a process of ozonating the water and then supplying hydrogen peroxide thereto at a controllable rate.

It has been found by the present inventor that these and other objects of the invention may be achieved in general by providing an apparatus for treating water stored in a reservoir to remove contaminants therefrom, comprising:
(a) means for receiving water to be treated through a feed line from the reservoir,
(b) means for adding ozone at a controlled rate to the water to be treated in the feed line,
(c) means for supplying hydrogen peroxide at a controlled rate to the water to be treated in the feed line,
(d) means for mixing the ozone and the hydrogen peroxide with the water to be treated to allow a reaction to occur that treats the water, and
(e) means for returning the treated water to the reservoir.

According to another aspect of the invention, there is provided a method for treating water stored in a reservoir to remove contaminants therefrom, comprising:
(a) receiving water to be treated through a feed line from the reservoir,
(b) adding ozone at a controlled rate to the water to be treated in the feed line,
(c) supplying hydrogen peroxide at a controlled rate to the water to be treated in the feed line,
(d) mixing the ozone and the hydrogen peroxide with the water to be treated to allow a reaction to occur that treats the water, and
(e) returning the treated water to the reservoir.

Preferably, the feed line includes a by-pass valve that controls the flow of water through the feed line by allowing a regulated rate of flow of the water through a flow line.

In a preferred form, the means for adding ozone at a controlled rate includes a venturi valve which responds to the rate of flow of water through the flow line by creating a vacuum in a supply line from a means for generating ozone, the extent of the vacuum created being dependent on the rate of flow.

The means for generating ozone may have a booster air pump to ensure consistent feed to the system during pressure variation through the venturi valve. The extent of the vacuum may be controlled by the rate of flow of water through the flow line and the size of the booster air pump on the ozone generator.

It is further preferred that the means for supplying hydrogen peroxide at a controlled rate includes a sensor probe of the oxidation reduction potential of the water, whereby the rate of supply of hydrogen peroxide is dependent on the oxidation reduction potential level.

The means for supplying hydrogen peroxide may include a venturi valve.

Preferably, a concentration of from 20 to 35 ppm of hydrogen peroxide is maintained in the water.

In another preferred form, the apparatus includes a water treatment chamber (referred to as a multicyclone unit) in which the ozone and the hydrogen peroxide are mixed with the water to allow the reaction to occur.

Preferably, the multiclycone unit contains a filter for removing any insoluble oxidation product of the reaction, such as iron oxide.

In a still further preferred form, the apparatus includes a timer that is programmed to control when water to be treated is received through the feed line.

The apparatus may further include a rain sensor that can override the programmed control of the timer and allow water to flow through the feed line when it senses rain.

An excess water overflow pipe may, in another preferred form, be operably associated with the by-pass valve.

There has been thus outlined, rather broadly, the more important features of the invention in order that the detailed description thereof that follows may be better understood and put into practical effect, and in order that the present contribution to the art may be better appreciated.

There are additional features of the invention that will be described hereinafter. As such, those skilled in the art will appreciate that the conception, upon which the disclosure is based, may be readily utilized as the basis for designing other apparatus and methods for carrying out the objects of the present invention. It is important, therefore, that the broad outline of the invention described above be regarded as including such equivalent constructions in so far as they do not depart from the spirit and scope of the present invention.

SUMMARY OF THE DRAWINGS

The invention will be better understood and objects other than those set forth above will become apparent when consideration is given to the following detailed description thereof. Such description makes reference to the accompanying drawings, in which.

DESCRIPTION OF PREFERRED EMBODIMENTS

Figure 1:
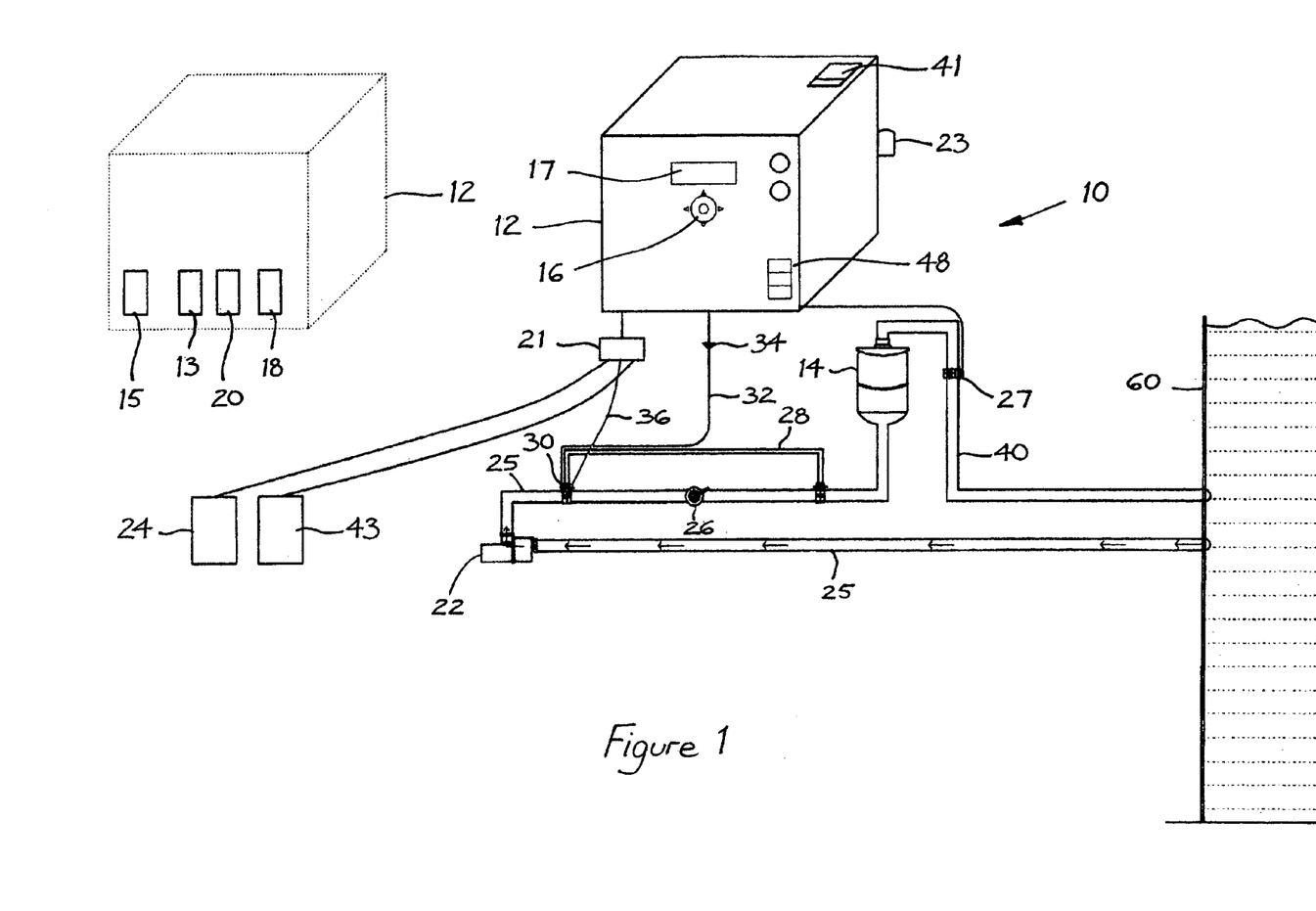
FIG. 1 is a side view of a water treatment apparatus according to a preferred embodiment of the invention.

With reference now to the drawing of FIG. 1, a water treatment apparatus and method embodying the principles and concepts of the present invention and generally designated by the reference numeral 10 will now be described.

The water treatment apparatus 10 for treating a body of water 60 (such as in a swimming pool) includes a control box 12 and a water treatment chamber in the form of a multicyclone unit 14 containing a cartridge filter.

The control box 12 contains an ozone generating unit 15 which is capable of generating 1 gram of ozone per hour from dried air supplied from an air drier 13 located in the control box. An alternative air supply could be from an oxygen concentrator unit located in the control box 12.

Figure 6:
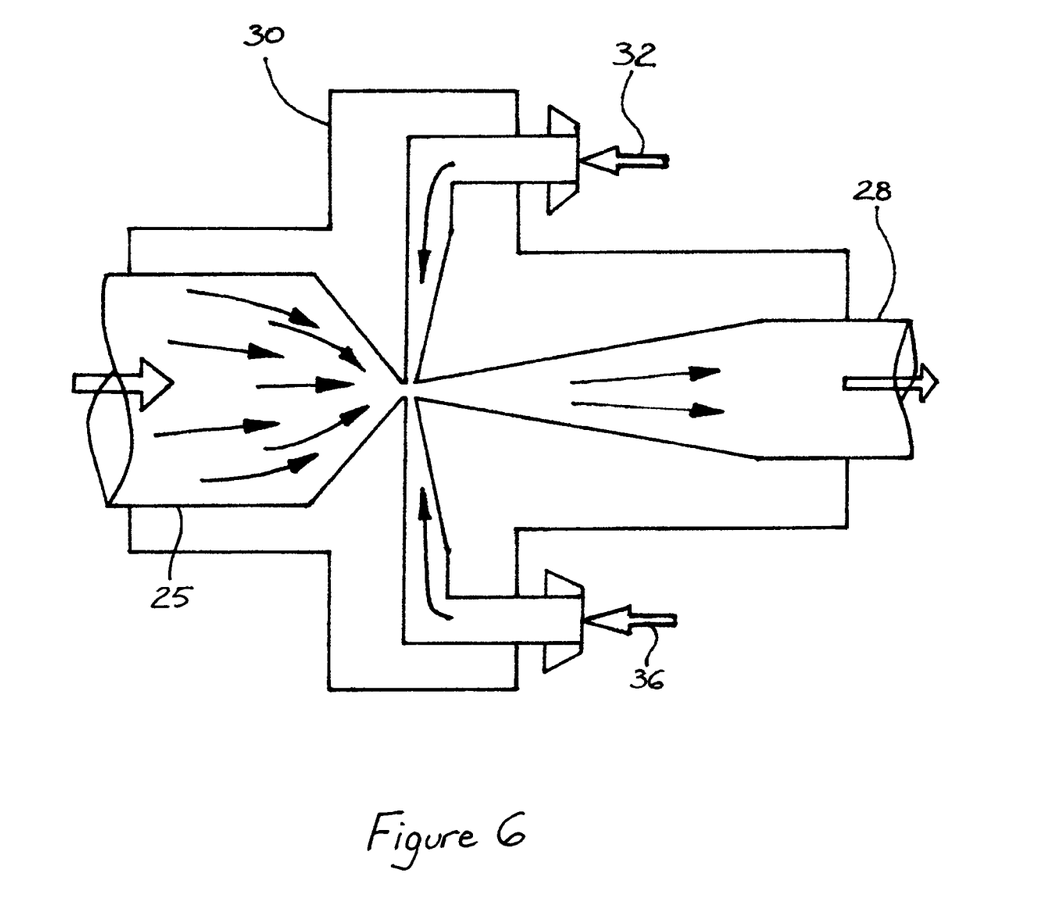
FIG. 6 is a side view of a venturi valve used in a preferred water treatment apparatus of the present invention.

Also contained in the control box 12 is a hydrogen peroxide/hydrochloric acid feeder unit 18 that controls a solenoid valve 21. The hydrogen peroxide and hydrochloric acid are drawn through a chemical feed line 36 and into a main feed line 25 via a venturi valve 30 (also known simply as a venturi or venturi injector, and shown in more detail in FIG. 6). The solenoid valve 21 opens when required to feed either hydrogen peroxide or hydrochloric acid as required from information received from an ORP (oxidation reduction potential) sensor probe 27. The solenoid valve 21 is connected to an external 25 liter supply tank 24 containing 50% v/v hydrogen peroxide or similar and to an external 15 liter supply tank 43 containing hydrochloric acid.

A timer unit 20 controls an external pump 22 and is set to run for the required time to treat the body of water 60. A power plug 23 for the pump 22 is on the control box 12.

The main feed line 25 from, say, the swimming pool 60 receives water to be treated. Downstream of where the feed line 25 enters the venturi valve 30 is a manually operable by-pass valve 26, and there is a flow line 28 from the venturi valve 30. The by-pass valve 26 can manually control the flow of water through the feed line 25 by diverting water from the swimming pool into venturi valve 30 and through flow line 28 from the venturi valve 30. The by-pass valve 26 controls the vacuum on the venturi valve 30 so the correct pressure can be set. The flow line 28 contains a combination of ozone and hydrogen peroxide or hydrochloric acid chemicals fed as required.

The venturi valve 30 acts on the feed line 25 and controls the rate at which ozone and the external chemicals (hydrogen peroxide and hydrochloric acid) is added to the water. The venturi valve 30 creates a vacuum in an ozone supply line 32 from the ozone generating unit 15. The extent of the vacuum is, in this embodiment, controlled by the rate of flow of water through the feed line 25 and is set when the flow through the feed line 25 starts. Along the ozone supply line 32 is a check valve 34.

The flow of water through the feed line 25 (and hence through the flow line 28) is therefore controlled by the manually operable by-pass valve 26, and this regulated flow rate controls the strength of the vacuum created by the venturi valve 30. Too high a water flow rate through the flow line 28 may create too high a vacuum in the ozone supply line 32 and thus draw too high a concentration of ozone from the ozone generating unit 15. This vacuum must also be regulated as the flow of hydrogen peroxide and hydrochloric acid from external tanks 24 and 43 are drawn through the venturi valve 30. A vacuum gauge 48 is located on the control box 12 and assists the user in controlling the strength of the vacuum for achieving the regulated flow rate of ozone, hydrogen peroxide and hydrochloric acid.

As indicated above, the rate at which hydrogen peroxide is supplied through the chemical feed line 36 may also be controlled. The control is facilitated by the ORP sensor probe 27, and is dependent on the predetermined ORP set level which is controlled through a display 17 made via a display control/set press pad 16 on the control box 12. When the set level of ORP is reached, the solenoid valve 21 will not operate. When the level of ORP is higher than the set level, the solenoid valve 21 will operate. This continual monitoring of the ORP level provides a fully measured level of hydrogen peroxide as required within the body of water to ensure that a desired peroxone reaction is present. In this embodiment, a concentration of from 20 to 35 ppm hydrogen peroxide is maintained in the water. A concentration as high as 35 ppm may be required for high temperature conditions.

As the water level in a swimming pool is unlikely to vary widely, such control of the rate at which hydrogen peroxide is added to the water is even more useful in domestic water tanks, where the water level may fall quickly with heavy demand and rise quickly with heavy rainfall.

Downstream of where the feed line 25 meets the flow line 28 is the multicyclone unit 14 containing the cartridge filter, into which water, aqueous ozone and hydrogen peroxide enter. The multicyclone unit 14 containing the cartridge filter allows the ozone and the hydrogen peroxide to be mixed with the water to enable the peroxone reaction to occur and the hydroxyl radicals so produced to disinfect and sanitize the water.

The cartridge filter in the multicyclone unit 14 filters out any insoluble oxidation products of the reaction, including iron oxide, and possibly manganese oxide, if the pool water contains iron and manganese metal ions.

The timer unit 20 is programmed to control when water to be treated is received through the feed line 25. In this embodiment, the timer unit 20 is set so that there are short intervals between water flow times through the feed line 25. This ensures consistency of the peroxone reaction.

Located on the top of the control box 12 is a rain water sensor 41 that can override the programmed control of the timer unit 20 and allow water'to flow through the feed line 25 when it senses rain. The rain water sensor 41 ensures that the untreated rain water entering the pool will not, as is usually the case if a pool is left untreated over a prolonged period of rain, turn the pool green with algae.

The ORP sensor probe 27 is located along a return pipe 40 and is calibrated to maintain pH of the water flowing through that pipe (and thus of the water from the swimming pool being treated) to a set point between 7.0 and 7.2. If the water pH is above that range (ie. alkaline), the ORP sensor probe 27 automatically activates the solenoid valve 21 via the feeder unit 18 to release the required amount of acid from the hydrochloric acid supply tank 43 through venturi valve 30 for the required time until the pH level returns to the set point. Control of the water pH is generally considered to be more important for swimming pool and spa purposes than it is for potable water purposes, as the World Health Organization regard an acceptable potable water pH range'to be between 5 and 10.

With reference now to the drawings of FIGS. 2 and 3, a first flush, rain water diverter system that can cooperate with the above described water treatment apparatus 10 will now be described.

By way of background, in a stormwater pipe system that connects to a water storage tank, the stormwater feed pipes to the water tank remain full of water and debris between rain, and that water becomes contaminated if left stagnant for long periods between rain. Such a stormwater pipe system is known as a "charged" system where, with rain, the stormwater tank feed pipes fill with water and overflow into the tank. When the rain stops, the pipes hold water below the overflow point until it rains again. When it again rains, the stagnant water, with contaminants, runs into the water storage tank.

The first flush, rain water diverter system to be described below utilizes a diverter valve that will allow the "charged" water and debris filling the stormwater tank feed pipes to discharge immediately after rain. The feed pipes will no longer hold stagnant water and will be filled with water only during rain.

Figure 2:
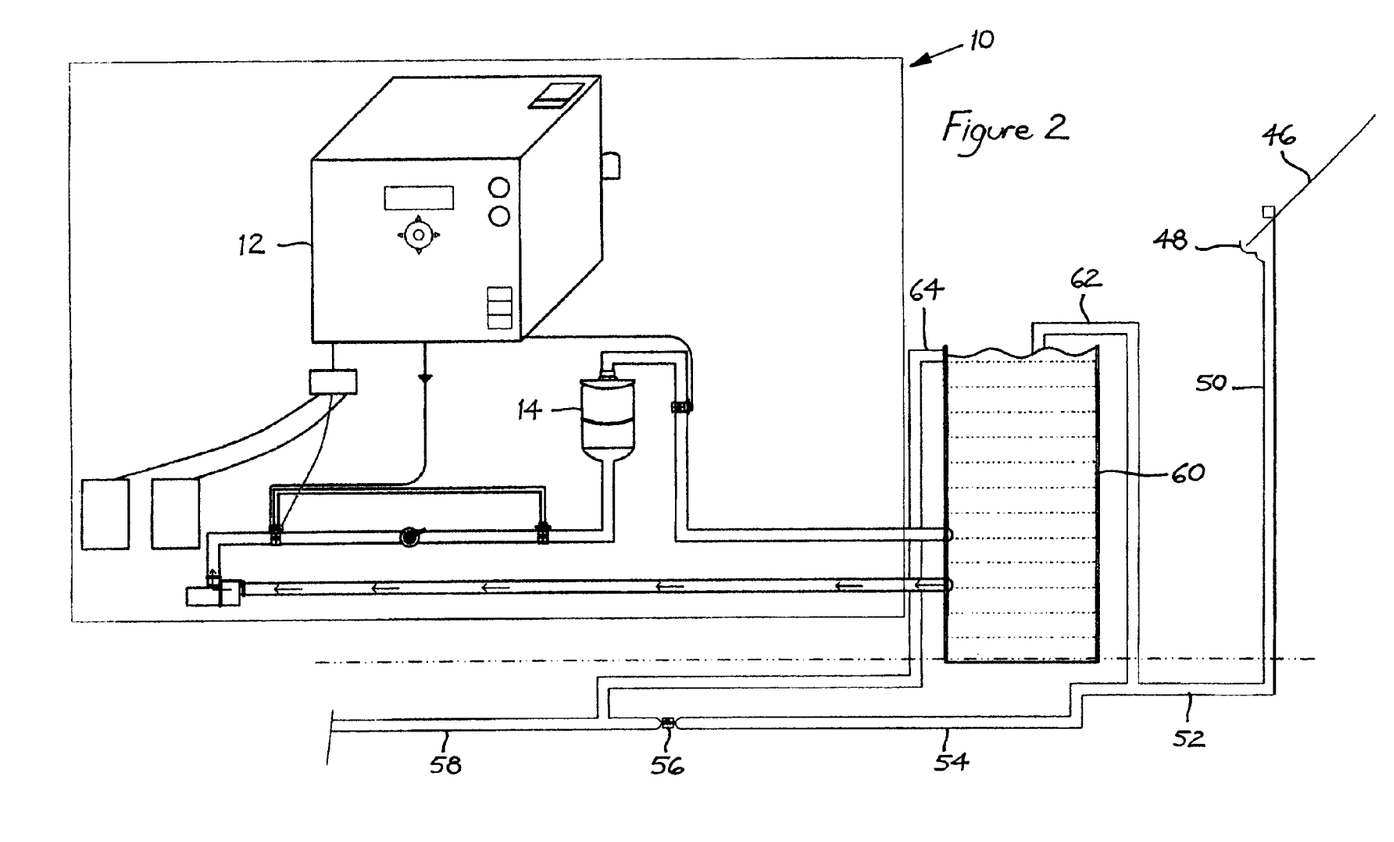
FIG. 2 is a side view of a first flush, rain water diverter system that can cooperate with the water treatment apparatus of FIG. 1.
Figure 3:
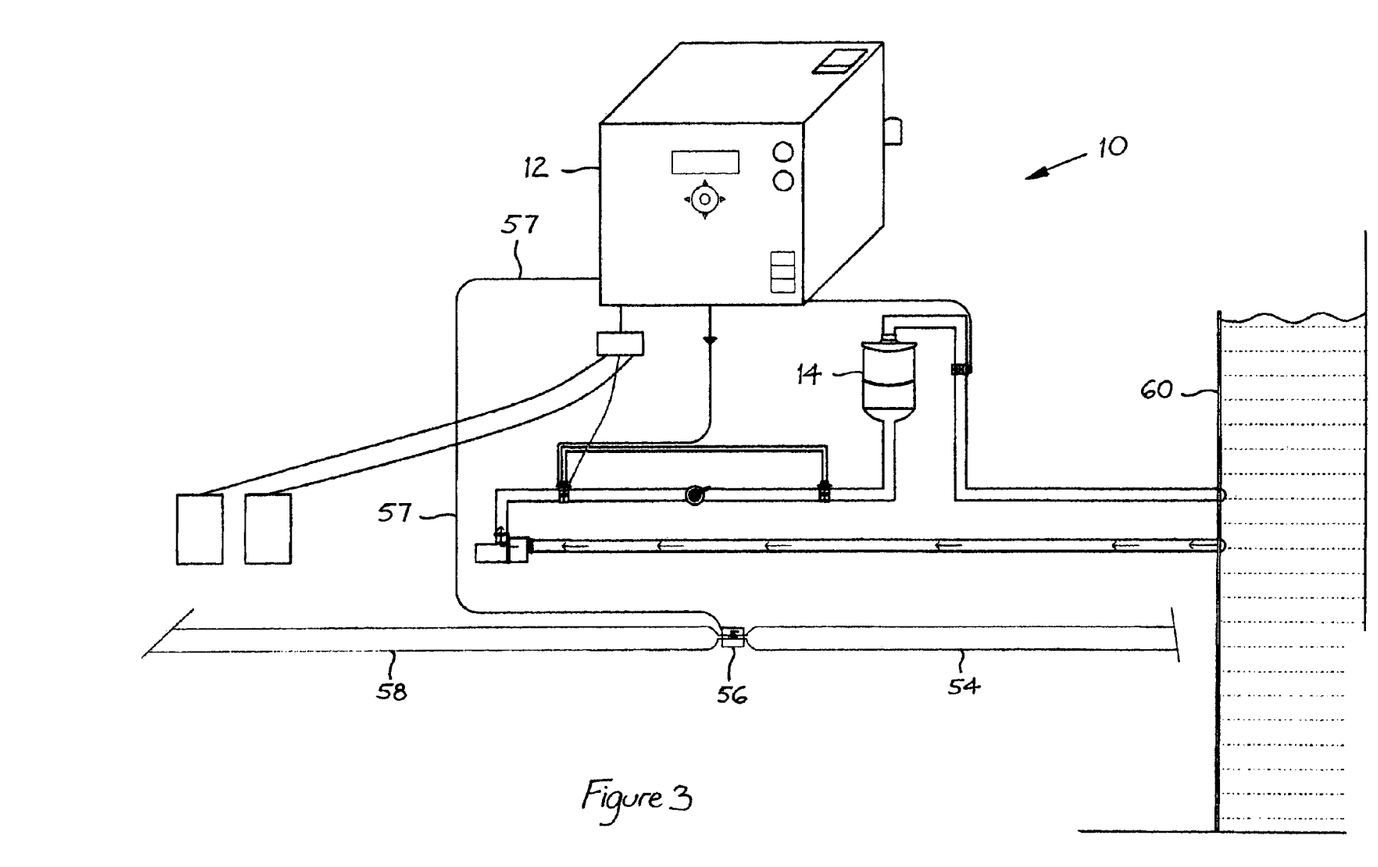
FIG. 3 is a side view of the apparatus of FIG. 1 interconnected with the diverter system of FIG. 2.

As is apparent from FIGS. 2 and 3, the first flush, rain water diverter system can cooperate with the water treatment apparatus 10 or can operate independently, such as with a solar panel for supplying power to it when a mains power supply is unavailable.

The diverter system also allows for a pipe to be used to receive and temporarily store the first flush of rain from a roof that may be contaminated with dirt and other debris. This can be discharged out of the system after the rain stops, thereby maintaining tank water quality.

Referring specifically to FIG. 2, at the start of rain, rain water flows from a roof 46 into the roof gutters 48, down a downpipe 50 and along a stormwater pipe 52 where, at a downstream point, the rain water drains down into a first flush diversion pipe 54.

As shown in more detail in FIG. 3, the start of rain is sensed by the rain sensor unit 41 which electronically activates, via a circuit line 57, an automatic control valve 56, which may also be referred to as a first flush diverter valve, to close, thereby preventing the first flush of rain water from the roof that enters the diversion pipe 54 from progressing passed the valve 56 and into the stormwater overflow discharge pipe 58.

Referring again to FIG. 2, the filling of water in the first flush diversion pipe 54 by the closing of the valve 56 allows subsequent rain water from the roof to enter a water storage tank 60 through a top inlet pipe 62. Any overflow from the tank 60 spills into overflow pipe 64 and then into the discharge pipe 58.

The end of rain is also sensed by the rain sensor unit 41 which causes the automatic control valve 56 to open, thereby allowing the first flush of rainwater to progress passed the valve 56 and into the discharge pipe 58.

Figure 4:
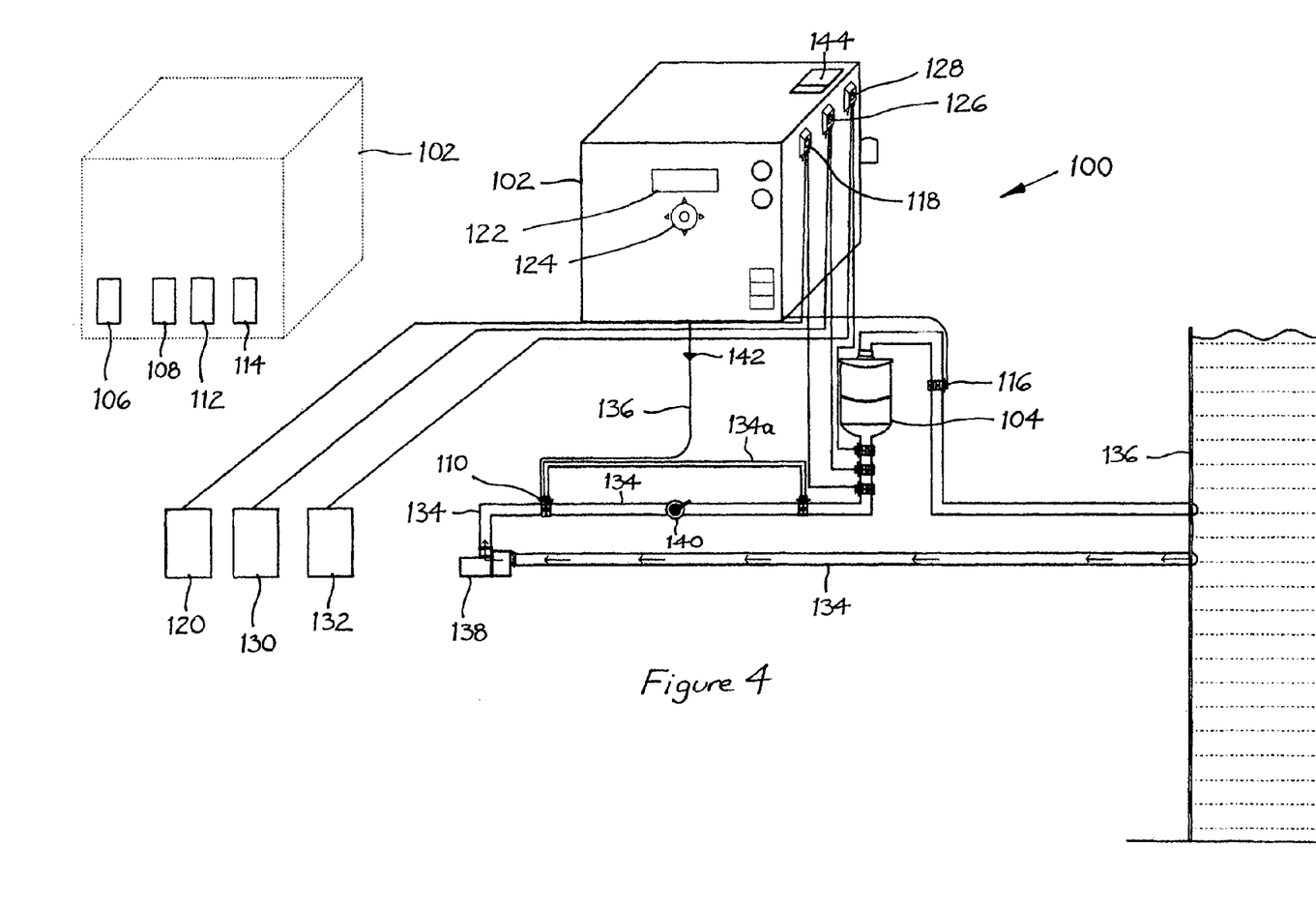
FIG. 4 is a side view of a water treatment apparatus according to another preferred embodiment of the invention.

The water treatment apparatus 100 shown in FIG. 4 includes a control box 102 and a mixing or water treatment chamber 104 (such as a multicyclone unit with cartridge filter). The control box 102 contains an ozone generator 106 which is capable of generating 1 to 2 grams of ozone per hour from dried air supply. An air drier 108 located in the control box 102 has a booster air pump to provide a constant supply of ozone to the system (even when there is a pressure drop on the venturi valve 110 to be described later). The booster air pump and air drier 108 could be replaced by an oxygen concentrator to achieve an even more consistent ozone supply.

Also contained in the control box 102 is a timer unit 112, a peristaltic pump control or feeder unit 114 and various electrical supply feeds to the various components.

Hydrogen peroxide is supplied to the water to be treated at a controlled rate. The control is facilitated by an ORP sensor probe 116, which interacts with the peristaltic pump control unit 114. The control unit 114 will control the feed of hydrogen peroxide to the water through a peristaltic pump 118 from a 25 liter supply tank 120 containing 50% v/v hydrogen peroxide, and that control will depend on the predetermined ORP set level which is controlled through a display 122 made via a display control/set press pad 124 on the control box 102. When the set level of ORP is reached, the peristaltic pump 118 will not operate. When the level of ORP is higher than the set level, the peristaltic pump 118 will operate. This continual monitoring of the ORP level provides a. fully measured level of hydrogen peroxide as required within the body of water to ensure that a desired peroxone reaction is present.

The higher is the ORP set level, the lower will be the residual level of hydrogen peroxide in the body of water.

The peristaltic pump control unit 114 will also control the feed of hydrochloric acid and base solution to the water through peristaltic pumps 126 and 128, respectively. The ORP sensor probe 116 will monitor the pH level in the water and add the chemicals as determined by the setting on the display 122 made via the display control/set press pad 124. The supply of acid and base is provided from storage containers 130 and 132, respectively.

A main feed line 134 from a swimming pool 136 (or other body of water) receives water to be treated. Upstream of a pump 138 on the feed line 134 is a by-pass valve 140 which controls flow through two lines. Along a flow line 134a to the mixing or water treatment chamber 104 is a venturi valve 110 which adds ozone into the flow line 134a which then re-enters the main feed line 134, which ozone then enters the chamber 104.

The venturi valve 110 acts on the feed line 134, and controls the rate at which ozone is added to the water in the flow line 134a and then into the feed line 134. The venturi valve 110, responding to the flow rate in the flow line 134a, creates a vacuum in an ozone supply line 136 from the ozone generator 106 located within the control box 102. Too high a water flow rate through the flow line 134a may create too high a vacuum in the ozone supply line 136, and thus draw too high a concentration of ozone from the ozone generator 106. A check valve 142 closes the supply line 136 from the ozone generator 106 when there is no flow through the feed line 134 to ensure that no water enters the ozone supply line when the system is off The timer unit 112 is programmed via the display control/set press pad 124 (and display 122) on the control box 102 to control when water to be treated is received through feed line 134. In this embodiment, the timer unit 112 is set so there are short intervals between water flow times through the feed line 134. This ensures the consistency of the peroxone reaction.

The optimum level of hydrogen peroxide in a swimming pool is between 20-25 ppm, although a level of 35 ppm may be desirable in high temperature conditions. As the water level in a domestic water tank will vary much more than in a swimming pool, the degree of control of the level of hydrogen peroxide with the use of the ORP sensor probe and the feed pump control unit is vital for use in such tanks.

The mixture of hydrogen peroxide with water from the swimming pool that enters the water treatment chamber 104 will mix with the ozone that also enters the treatment chamber 104 to allow the peroxone reaction to occur. The hydroxyl radicals produced by that reaction can then disinfect and sanitize the water.

The chamber 104 contains a cartridge filter bag for filtering out any insoluble oxidation products of the reaction, including iron oxide, and possibly manganese oxide, if the pool water contains iron and manganese metal ions.

The concentration of ozone added to the feed line 134 may, in another embodiment, be in excess of that required for complete reaction with hydrogen peroxide, so that some of the unreacted or residual ozone returns with the treated water through a return line to the swimming pool. The unreacted ozone may cause direct oxidation of biological and other organic contaminants in the water in the swimming pool.

Located on the top of the control box 102 is a rain water sensor 144 that can override the programmed control of the timer unit 112 and allow water to flow through the feed line 134 when it senses rain. The rain water sensor 144 ensures that untreated rain water entering the pool will not, as usually is the case if a pool is left untreated over a prolonged period of rain, turn the pool green with algae.

Figure 5:
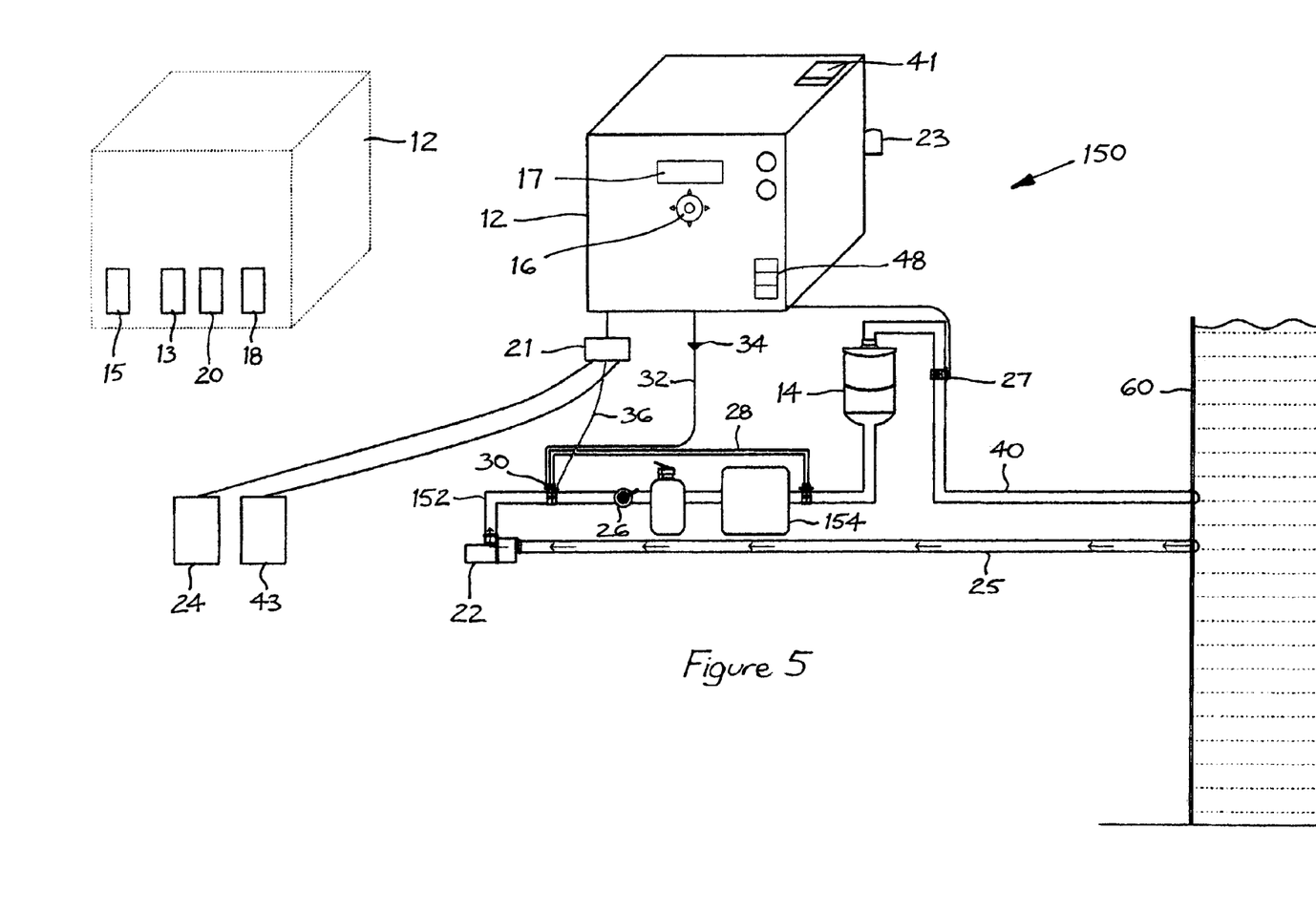
FIG. 5 is a side view of a preferred water treatment apparatus of the present invention which is a retro-fit of the apparatus of FIG. 1 to a conventional pool filtration system.

The water treatment apparatus 150 shown in FIG. 5 is of the water treatment apparatus 10 retro-fitted to a return line 152 of a conventional pool filtration system which includes other pool associated devices, such as a pool heater 154. Like features with the apparatus 10 are given like numbers.

It will be readily apparent from the above that there are various advantages of the present invention.

One advantage is that, by controlling the amounts of ozone and hydrogen peroxide added to the water flowing through the feed line, a desired ratio of hydroxyl radical formed by the peroxone reaction to unreacted or residual ozone in the treatment chamber can be, achieved so as to suit the type and extent of contamination in the water.

Still further advantages of the present invention will be apparent to persons skilled in the art.

It will also be readily apparent to persons skilled in the art that various modifications may be made in details of design and construction of the embodiments of the water treatment apparatus, and in the steps of the methods described above, without departing from the scope or ambit of the present invention.

For example, the peristaltic pump used in the above embodiments may be replaced by a diaphragm pump which typically provides higher doses with greater reliability and provides quicker delivery in response to higher demand, as may be desired in many commercial applications.

The invention claimed is:

1. An apparatus for treating water stored in a reservoir to remove contaminants, comprising:
    (a) means for receiving water to be treated through a feed line from the reservoir;
    (b) means for adding ozone at a controlled rate to the water to be treated in the feed line;
    (c) means for supplying hydrogen peroxide at a controlled rate to the water to be treated in the feed line, the means for supplying hydrogen peroxide includes a sensor probe adapted to determine an oxidation reduction potential of the water, whereby a rate of supply of hydrogen peroxide is dependent on the oxidation reduction potential;
    (d) a multicyclone unit configured to promote mixing of the ozone and the hydrogen peroxide with the water to be treated, the multicyclone unit including a water treatment chamber, the water treatment chamber including a filter disposed therein that is configured for removing insoluble oxidation product; and
    (e) a return line for returning treated water to the reservoir;
    wherein the means for adding ozone at a controlled rate includes a venturi valve which responds to a rate of flow of water by creating a vacuum in an ozone supply line, and wherein the multicyclone unit is located in the return line between the venturi valve and the reservoir.

2. The water treatment apparatus of claim 1, wherein a force generated by the vacuum is proportional to the rate of flow in the feed line.

3. The water treatment apparatus of claim 2, wherein the feed line includes a by-pass valve that controls the flow of water through the feed line by allowing a regulated flow of the water through a flow line.

4. The water treatment apparatus of claim 3, wherein the means for supplying hydrogen peroxide at a controlled rate includes a venturi valve.

5. The water treatment apparatus of claim 3, wherein a first end of the flow line is connected to the feed line at the venturi valve and a second end of the flow line is connected to the feed line at a junction, wherein the by-pass valve is located between the venturi valve and the junction.

6. The water treatment apparatus of claim 1, further comprising a rain sensor adapted to allow water to flow through the feed line when rain is sensed.

7. The water treatment apparatus of claim 1, further comprising a peristaltic pump adapted to supply the hydrogen peroxide at a controlled rate.

8. The water treatment apparatus of claim 7, wherein the peristaltic pump is controlled in response to a signal generated by the sensor probe located in the feed line downstream of the venturi valve.

9. The water treatment apparatus of claim 1, wherein a concentration of between about 20 and 35 ppm of hydrogen peroxide is maintained in the water.

10. The water treatment apparatus of claim 1, wherein the apparatus includes a timer that is programmed to control when water is directed into the feed line.

11. An apparatus for treating water stored in a reservoir to remove contaminants, comprising:
- a water treatment chamber including a filter disposed therein that is configured for removing insoluble oxidation product;
- a feed line configured to fluidly connect the water treatment chamber to the reservoir;
- an ozone generating unit including:
  - an ozone supply line, the ozone generating unit fluidly connected to the the feed line by the ozone supply line and configured to supply ozone at a controlled rate; and
  - a venturi valve which is configured to create a vacuum in the ozone supply line in response to a rate of flow of water;
- a hydrogen peroxide feeder unit fluidly connected to the feed line and configured to supply hydrogen peroxide at a controlled rate to the feed line, the hydrogen peroxide feeder unit includes a sensor probe adapted to determine an oxidation reduction potential of water, whereby a rate of supply of hydrogen peroxide is dependent on the oxidation reduction potential;
- a multicyclone unit configured to promote mixing of the ozone and the hydrogen peroxide with water to be treated, the multicyclone unit including the water treatment chamber; and
- a return line configured to return treated water to the reservoir, wherein the multicyclone unit is located in the return line between the venturi valve and the reservoir.

12. The water treatment apparatus of claim 11, wherein a force generated by the vacuum is proportional to the rate of flow in the feed line.

13. The water treatment apparatus of claim 12, wherein the feed line includes a by-pass valve that controls flow of water through the feed line by allowing a regulated flow of water through a flow line.

14. The water treatment apparatus of claim 13, wherein a first end of the flow line is connected to the feed line at the venturi valve and a second end of the flow line is connected to the feed line at a junction, wherein the by-pass valve is located between the venturi valve and the junction.

15. The water treatment apparatus of claim 11, further comprising a rain sensor adapted to allow water to flow through the feed line when rain is sensed.

16. The water treatment apparatus of claim 11, further comprising a peristaltic pump adapted to supply the hydrogen peroxide at a controlled rate.

17. The water treatment apparatus of claim 16, wherein the peristaltic pump is controlled in response to a signal generated by the sensor probe located in the feed line downstream of the venturi valve.

18. The water treatment apparatus of claim 11, wherein a concentration of between about 20 and 35 ppm of hydrogen peroxide is maintained in the water.

19. The water treatment apparatus of claim 11, further comprising a timer that is programmed to control when water is directed into the feed line.

* * * * *